Feb. 5, 1957  H. EISMANN ET AL  2,780,138
PHOTOGRAPHIC OBJECTIVE HAVING THREE MENISCUS
SHAPED ELEMENTS AIR SPACED APART
Filed March 15, 1955

United States Patent Office 2,780,138
Patented Feb. 5, 1957

2,780,138
PHOTOGRAPHIC OBJECTIVE HAVING THREE MENISCUS SHAPED ELEMENTS AIR SPACED APART

Helmut Eismann, Heidenheim (Brenz), Walter Jahn, Konigsbronn, and Günther Lange, Heidenheim (Brenz), Germany, assignors to Carl Zeiss, Heidenheim (Brenz), Wurttemberg, Germany Application March 15, 1955, Serial No. 494,354
Claims priority, application Germany April 5, 1954
2 Claims. (Cl. 88—57)

The present invention concerns photographic objectives consisting of three meniscus-shaped elements, separated from one another by air spaces, namely of a simple collective front element which turns the convex side towards the object to be photographed, of a dispersive middle element, and of a collective rear element, whereby the two last mentioned elements turn their concave sides towards one another and each consists of two cemented together lenses of opposite refractive power in such a way, that the two cemented surfaces turn their convex sides towards one another. The objectives in accordance with the invention are characterized by a well-balanced state of correction, which comes about through the working together of the following characteristics: the cemented surface in the middle element has dispersive and the cemented surface in the rear element collective action, the central thickness of each of the cemented elements amounts to less than the 0.2-fold of the focal length $f$ of the objective, the refractive index of the lens of the cemented middle element turned towards the rear element is greater than 1.640, and finally still the following conditions are fulfilled:

$$0.35 \cdot f < L < 0.45 \cdot f$$
$$0.20 \cdot f < r_3 < 0.28 \cdot f$$
$$0.17 \cdot f < r_5 < 0.21 \cdot f$$
$$0.60 \cdot f < r_6 < 1.20 \cdot f$$
$$0.25 \cdot f < r_7 < 0.35 \cdot f$$
$$0.45 \cdot f < r_8 < 0.90 \cdot f$$

whereby the over-all length of the objective is designated with L and the radii of the respective surfaces with $r$.

Figure 1:
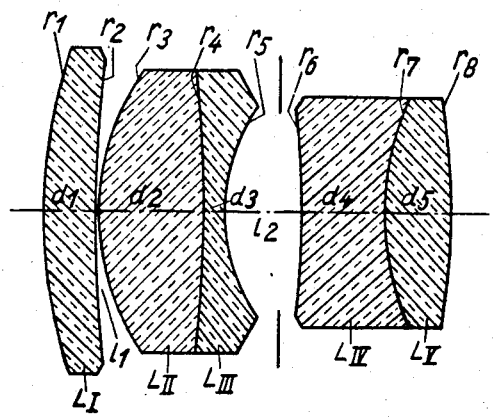
Figure 2:
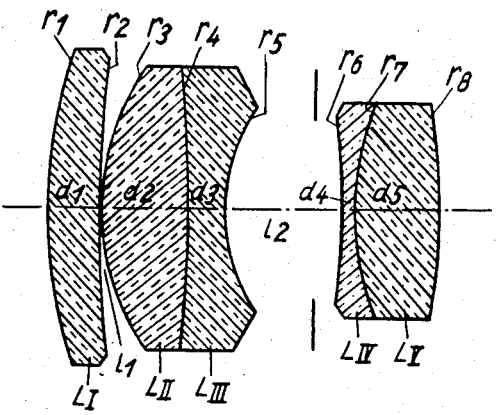

Two objectives with the characteristics of the present invention are represented in Figures 1 and 2 of the annexed illustrations. In their construction they correspond to the numerical values specified in the two following tables. These two objectives form part of the invention with these numerical values, of which the surface refractive powers ($\Delta n/r$) each deviate at most by $\pm 0.5/f$ and of which the thicknesses and air distances each deviate at most by $\pm 0.05 \cdot f$ from the values to be taken from the following tables:

Example I (Fig. 1)

[1:3.5]

| Lenses | Radii | Thicknesses and Distances | $n_d$ | V | ($\Delta n/r$) |
|---|---|---|---|---|---|
| $L_I$ | $r_1 = +0.496335$ | $d_1 = 0.05236$ | 1.66672 | 48.4 | $+1.343286/f$ |
|  | $r_2 = +1.30177$ | $l_1 = 0.00201$ |  |  | $-0.512164/f$ |
|  | $r_3 = +0.245204$ |  |  |  | $+2.469861/f$ |
| $L_{II}$ |  | $d_2 = 0.10434$ | 1.60562 | 43.9 |  |
|  | $r_4 = -1.22898$ |  |  |  | $-0.075945/f$ |
| $L_{III}$ |  | $d_3 = 0.02154$ | 1.69895 | 30.1 |  |
|  | $r_5 = +0.181248$ |  |  |  | $-3.856318/f$ |
|  |  | $l_2 = 0.07605$ |  |  |  |
|  | $r_6 = -0.870001$ |  |  |  | $-0.658723/f$ |
| $L_{IV}$ |  | $d_4 = 0.08221$ | 1.57309 | 42.7 |  |
|  | $r_7 = +0.279113$ |  |  |  | $+0.460207/f$ |
| $L_V$ |  | $d_5 = 0.06684$ | 1.70154 | 41.1 |  |
|  | $r_8 = -0.661877$ |  |  |  | $+1.059925/f$ |

Example II (Fig. 2)

[1:3.8]

| Lenses | Radii | Thicknesses and Distances | $n_d$ | V | ($\Delta n/r$) |
|---|---|---|---|---|---|
| $L_I$ | $r_1 = +0.482477$ | $d_1 = 0.05160$ | 1.66672 | 48.4 | $+1.381868/f$ |
|  | $r_2 = +1.24730$ | $l_1 = 0.00134$ |  |  | $-0.534531/f$ |
|  | $r_3 = +0.241815$ |  |  |  | $+2.504476/f$ |
| $L_{II}$ |  | $d_2 = 0.08511$ | 1.60562 | 43.9 |  |
|  | $r_4 = -1.44035$ |  |  |  | $-0.064797/f$ |
| $L_{III}$ |  | $d_3 = 0.03900$ | 1.69895 | 30.1 |  |
|  | $r_5 = +0.178737$ |  |  |  | $-3.910494/f$ |
|  |  | $l_2 = 0.11460$ |  |  |  |
|  | $r_6 = -0.786994$ |  |  |  | $-0.756689/f$ |
| $L_{IV}$ |  | $d_4 = 0.01340$ | 1.59551 | 39.2 |  |
|  | $r_7 = +0.283286$ |  |  |  | $+0.451522/f$ |
| $L_V$ |  | $d_5 = 0.08283$ | 1.72342 | 38.23 |  |
|  | $r_8 = -0.616205$ |  |  |  | $+1.190237/f$ |

In both examples $L_I$ to $L_V$ are the single elements, and the Roman numerals refer to these elements starting with the front side, $r_1$ to $r_8$ are the radii of curvature of the refractive surfaces from front to rear as indicated in the drawing, the $+$ and $-$ signs refer respectively to surfaces convex and concave to the front, $d_1$ to $d_5$ are the axial thicknesses of the elements, L is the axial over-all length of the objective, $l_1$ is the air spacing between elements $L_I$ and $L_{II}$ and $l_2$ is the air spacing between elements $L_{III}$ and $L_{IV}$, $n_d$ is the index of refraction with reference to the $d$-line of the spectrum, V is the dispersive index, and $\Delta n/r$ is the refractive power of the respective surface.

We claim:

1. Photographic objective consisting of three meniscus-shaped elements, separated from one another by air spaces, the first being a simple collective front element turning its convex side towards the object to be photographed, the second being a dispersive middle element, and the third being a collective rear element, the two last mentioned elements turning their concave sides towards one another and each said last mentioned elements consisting of two cemented together lenses of opposite refractive power the two cemented surfaces turning their convex sides towards one another, the cemented surface in the said middle element having dispersive and the cemented surface in the said rear element having collective action, the central thickness of each of the said cemented elements amounting to less than the 0.2-fold of the focal length $f$ of the objective, and the refractive index of the lens of the said cemented middle element turned totwards the rear element being greater than 1.640, and finally the following further conditions being fulfilled:

$$0.35 \cdot f < L < 0.45 \cdot f$$
$$0.20 \cdot f < r_3 < 0.28 \cdot f$$
$$0.17 \cdot f < r_5 < 0.21 \cdot f$$
$$0.60 \cdot f < r_6 < 1.20 \cdot f$$
$$0.25 \cdot f < r_7 < 0.35 \cdot f$$
$$0.45 \cdot f < r_8 < 0.90 \cdot f$$

and in which the surface refractive powers ($\Delta n/r$) each deviate at most by $\pm 0.5/f$, and the thicknesses and air distances each at most by $\pm 0.05 \cdot f$ from the values to be taken from the following numerical example:

| Lenses | Radii | Thicknesses and Distances | $n_d$ | V | $(\Delta n/r)$ |
|---|---|---|---|---|---|
| $L_I$ | $r_1 = +0.496335 \cdot f$ | $d_1 = 0.05236 \cdot f$ | 1.66672 | 48.4 | $+1.343286/f$ |
|  | $r_2 = +1.30177 \cdot f$ |  |  |  | $-0.512164/f$ |
|  |  | $l_1 = 0.00201 \cdot f$ |  |  |  |
|  | $r_3 = +0.245204 \cdot f$ |  |  |  | $+2.469861/f$ |
| $L_{II}$ |  | $d_2 = 0.10434 \cdot f$ | 1.60562 | 43.9 |  |
|  | $r_4 = -1.22898 \cdot f$ |  |  |  | $-0.075945/f$ |
| $L_{III}$ | $r_5 = +0.181248 \cdot f$ | $d_3 = 0.02154 \cdot f$ | 1.69895 | 30.1 | $-3.856318/f$ |
|  |  | $l_2 = 0.07605 \cdot f$ |  |  | $-0.658723/f$ |
|  | $r_6 = -0.870001 \cdot f$ |  |  |  |  |
| $L_{IV}$ |  | $d_4 = 0.08221 \cdot f$ | 1.57309 | 42.7 | $+0.460207/f$ |
|  | $r_7 = +0.279113 \cdot f$ |  |  |  |  |
| $L_V$ |  | $d_5 = 0.06684 \cdot f$ | 1.70154 | 41.1 | $+1.059925/f$ |
|  | $r_8 = -0.661877 \cdot f$ |  |  |  |  | where $L_I$ to $L_V$ are the single elements, and the Roman numerals refer to these elements starting with the front side, $r_1$ to $r_8$ are the radii of curvature of the refractive surfaces from front to rear as indicated in the drawing, the $+$ and $-$ signs refer respectively to surfaces convex and concave to the front, $d_1$ to $d_5$ are the axial thicknesses of the elements, L is the axial overall length of the objective, $l_1$ is the air spacing between elements $L_I$ and $L_{II}$ and $l_2$ is the air spacing between elements $L_{III}$ and $L_{IV}$, $n_d$ is the index of refraction with reference to the $d$-line of the spectrum, V is the dispersive index, and $\Delta n/r$ is the refractive power of the respective surface.

2. Photographic objective consisting of three meniscus-shaped elements, separated from one another by air spaces, the first being a simple collective front element turning its convex side towards the object to be photographed, the second being a dispersive middle element, and the third being a collective rear element, the two last mentioned elements turning their concave sides towards one another and each said last mentioned elements consisting of two cemented together lenses of opposite refractive power the two cemented surfaces turning their convex sides towards one another, the cemented surface in the said middle element having dispersive and the cemented surface in the said rear element having collective action, the central thickness of each of the said cemented elements amounting to less than the 0.2-fold of the focal length $f$ of the objective, and the refractive index of the lens of the said cemented middle element turned towards the rear element being greater than 1.640, and finally following further conditions being fulfilled:

$$0.35 \cdot f < L < 0.45 \cdot f$$
$$0.20 \cdot f < r_3 < 0.28 \cdot f$$
$$0.17 \cdot f < r_5 < 0.21 \cdot f$$
$$0.60 \cdot f < r_6 < 1.20 \cdot f$$
$$0.25 \cdot f < r_7 < 0.35 \cdot f$$
$$0.45 \cdot f < r_8 < 0.90 \cdot f$$

and in which the surface refractive powers $(\Delta n/r)$ each deviate at most by $\pm 0.5/f$, and the thicknesses and the air distances each at most by $\pm 0.05 \cdot f$ from the values to be taken from the following numerical example:

| Lenses | Radii | Thicknesses and Distances | $n_d$ | V | $(\Delta n/r)$ |
|---|---|---|---|---|---|
| $L_I$ | $r_1 = +0.482477 \cdot f$ | $d_1 = 0.05160 \cdot f$ | 1.66672 | 48.4 | $+1.381868/f$ |
|  | $r_2 = +1.24730 \cdot f$ |  |  |  | $-0.534531/f$ |
|  |  | $l_1 = 0.00134 \cdot f$ |  |  |  |
|  | $r_3 = +0.241815 \cdot f$ |  |  |  | $+2.504476/f$ |
| $L_{II}$ |  | $d_2 = 0.08511 \cdot f$ | 1.60562 | 43.9 |  |
|  | $r_4 = -1.44035 \cdot f$ |  |  |  | $-0.064797/f$ |
| $L_{III}$ | $r_5 = +0.178737 \cdot f$ | $d_3 = 0.03900 \cdot f$ | 1.69895 | 30.1 | $-3.910494/f$ |
|  |  | $l_2 = 0.11460 \cdot f$ |  |  | $-0.756689/f$ |
|  | $r_6 = -0.786994 \cdot f$ |  |  |  |  |
| $L_{IV}$ |  | $d_4 = 0.01340 \cdot f$ | 1.59551 | 39.2 | $+0.451522/f$ |
|  | $r_7 = +0.283286 \cdot f$ |  |  |  |  |
| $L_V$ |  | $d_5 = 0.08283 \cdot f$ | 1.72342 | 38.23 | $+1.190237/f$ |
|  | $r_8 = -0.616205 \cdot f$ |  |  |  |  | where $L_I$ to $L_V$ are the single elements, and the Roman numerals refer to these elements starting with the front side, $r_1$ to $r_8$ are the radii of curvature of the refractive surfaces from front to rear as indicated in the drawing, the $+$ and $-$ signs refer respectively to surfaces convex and concave to the front, $d_1$ to $d_5$ are the axial thicknesses of the elements, L is the axial overall length of the objective, $l_1$ is the air spacing between elements $L_I$ and $L_{II}$ and $l_2$ is the air spacing between elements $L_{III}$ and $L_{IV}$, $n_d$ is the index of refraction with reference to the $d$-line of the spectrum, V is the dispersive index, and $\Delta n/r$ is the refractive power of the respective surface.

References Cited in the file of this patent

UNITED STATES PATENTS

| | | |
|---|---|---|
| 1,880,394 | Altman | Oct. 4, 1932 |
| 1,939,098 | Berek | Dec. 12, 1933 |
| 1,998,704 | Bertele | Apr. 23, 1935 |
| 2,186,622 | Bertele | Jan. 9, 1940 |
| 2,562,012 | Bertele | July 24, 1951 |
| 2,623,434 | Bechtold | Dec. 30, 1952 |